(12) United States Patent
Yang (10) Patent No.: US 12,325,400 B2
(45) Date of Patent: Jun. 10, 2025

(54) APPARATUS AND METHOD FOR CONTROLLING BRAKING FORCE OF VEHICLE

(71) Applicant: HYUNDAI MOBIS Co., Ltd., Seoul (KR)

(72) Inventor: Jin Ho Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 92 days.

(21) Appl. No.: 17/881,157

(22) Filed: Aug. 4, 2022

(65) Prior Publication Data

US 2023/0174030 A1 Jun. 8, 2023

(30) Foreign Application Priority Data

Dec. 8, 2021 (KR) ........................ 10-2021-0175062

(51) Int. Cl.
*B60T 8/17* (2006.01)
*B60T 8/172* (2006.01)
*B60T 8/1755* (2006.01)

(52) U.S. Cl.
CPC .......... *B60T 8/17551* (2013.01); *B60T 8/172* (2013.01); *B60T 8/17558* (2013.01);
(Continued)

(58) Field of Classification Search
CPC .. B60T 8/17551; B60T 8/172; B60T 8/17558; B60T 2201/022; B60T 2210/32; B60T 2270/30; B60T 2201/024; B60T 2201/089; B60T 2210/12; B60T 2210/124; B60T 2210/14; B60T 2230/03;
(Continued)

(56) References Cited

U.S. PATENT DOCUMENTS 5,934,770 A * 8/1999 Okazaki ................ B60T 8/4275
303/150
10,759,433 B2 9/2020 Falconer et al.
(Continued)

FOREIGN PATENT DOCUMENTS

CN 107499262 A 12/2017
CN 111688707 A 9/2020
(Continued)

OTHER PUBLICATIONS

Extended European Search Report issued Apr. 11, 2023 for corresponding European Patent Application No. 22188327.5.
(Continued)

*Primary Examiner* — Rodney A Butler
(74) *Attorney, Agent, or Firm* — MORGAN, LEWIS & BOCKIUS LLP (57) ABSTRACT

An apparatus for controlling a braking force of a vehicle is provided. The apparatus includes a sensor device that obtains information about an image in front of the vehicle and driving information of the vehicle and a controller that determines a road surface state including a left road surface state and a right road surface state based on the information about the image and the driving information and controls a braking force of left wheels of the vehicle and a braking force of right wheels of the vehicle respectively based on the left road surface state and the right road surface state of the vehicle.

10 Claims, 4 Drawing Sheets

(52) U.S. Cl.
CPC ..... *B60T 2201/022* (2013.01); *B60T 2210/32* (2013.01); *B60T 2270/30* (2013.01)

(58) Field of Classification Search
CPC .. B60T 2250/03; B60T 2250/04; B60T 8/171; B60T 8/1764; B60T 8/174; B60Y 2300/09; B60Y 2400/3032; B60Y 2400/304; B60W 10/18; B60W 30/08; B60W 40/06; B60W 40/10; B60W 2520/105; B60W 2520/14; B60W 2520/28; G06N 3/08
See application file for complete search history.

(56) References Cited

U.S. PATENT DOCUMENTS

| | | | | |
|---|---|---|---|---|
| 2019/0111932 A1* | 4/2019 | Falconer | ......... | B60W 30/18045 |
| 2020/0062248 A1* | 2/2020 | Hasegawa | ......... | B60W 30/0956 |
| 2020/0262434 A1 | 8/2020 | Watanabe | | |
| 2020/0298756 A1 | 9/2020 | Cattani et al. | | |
| 2020/0324795 A1* | 10/2020 | Bojarski | ............ | G01C 21/3602 |
| 2021/0171035 A1* | 6/2021 | Takahama | .............. | B62D 6/002 |

FOREIGN PATENT DOCUMENTS

| | | |
|---|---|---|
| EP | 3546312 A1 | 10/2019 |
| EP | 3904186 A1 | 11/2021 |
| WO | 2021/059670 A1 | 4/2021 |

OTHER PUBLICATIONS

Office Action issued in corresponding European Patent Application No. 22188327.5, dated Aug. 16, 2024.
Office communication issued in corresponding European Application No. 22188327.5 dated Mar. 4, 2024.
European Office Action dated Jan. 21, 2025 issued in European Patent Application No. 22188327.5.

* cited by examiner

APPARATUS AND METHOD FOR CONTROLLING BRAKING FORCE OF VEHICLE

CROSS-REFERENCE TO RELATED APPLICATION

This application claims the benefit of priority to Korean Patent Application No. 10-2021-0175062, filed in the Korean Intellectual Property Office on Dec. 8, 2021, the entire contents of which are incorporated herein by reference.

TECHNICAL FIELD

The present disclosure relates to an apparatus and a method for controlling a braking force of a vehicle.

BACKGROUND

In general, an automated emergency braking system (AEBS) is a system which assists a driver to predict and determine a risk of collision with a vehicle, a pedestrian, or an obstacle by sensing surrounding environments and momentarily apply a braking command to automatically avoid the collision.

When a target predicted to collide is located within a route, the AEBS applies a warning or braking when it is less than or equal to a predefined time-to-collision (TTC) threshold. When applying the braking, the AEBS calculates braking command target values of various levels such as partial braking and full braking.

However, a braking target value of an existing AEBS is calculated on the basis of a friction coefficient of an asphalt road. Thus, because the braking distance is long when the friction coefficient of the road surface is lowered according to weather or driving environments, when braking is applied on the basis of a fixed TTC threshold, it is difficult to avoid a collision. Furthermore, there is a risk of oversteer when emergency braking is performed with the same braking force in situations where the friction coefficients of the road surfaces on which the left and right wheels pass are different from each other, for example, a pothole (or puddle) deflected to the lane or partial freezing.

SUMMARY

The present disclosure has been made to solve the above-mentioned problems occurring in the prior art while advantages achieved by the prior art are maintained intact.

An aspect of the present disclosure provides an apparatus and a method for controlling a braking force of a vehicle to develop an automatic braking system in various road surface situations for the advancement of fully autonomous driving and a driver assistance system and apply active safety and a collision avoidance system in the various road surface situations based on images and deep learning.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a braking force of a vehicle may include a sensor device that obtains information about an image in front of the vehicle and driving information of the vehicle and a controller that determines a road surface state including a left road surface state and a right road surface state based on the information about the image and the driving information and controls a braking force of left wheels of the vehicle and a braking force of right wheels of the vehicle respectively based on the left road surface state and the right road surface state of the vehicle.

In an embodiment, the controller may determine the road surface state and a drivable area of the vehicle from the information about the image by means of a convolutional neural network (CNN).

In an embodiment, the controller may divide the image into a left image and a right image and may determine the road surface state of each of the left image and the right image from the information about the image.

In an embodiment, the controller may determine the road surface state from the driving information obtained during a predetermined time period by means of a deep neural network (DNN).

In an embodiment, the controller may determine the left road surface state of the vehicle from the driving information obtained during the predetermined time period by an acceleration sensor, a yaw rate sensor, and left wheel speed sensors by means of the DNN and may determine the right road surface state of the vehicle from the driving information obtained during the predetermined time period by the acceleration sensor, the yaw rate sensor, and right wheel speed sensors by means of the DNN.

In an embodiment, the controller may compare a time to collision (TTC) based on the left road surface state of the vehicle and the right road surface state of the vehicle with a reference TTC to determine a risk of collision.

In an embodiment, the controller may compare an amount of braking of the left wheels of the vehicle and an amount of braking of the right wheels of the vehicle based on the risk of collision with a required deceleration and may select a smaller value among the amount of braking of the left wheels of the vehicle and the amount of braking of the right wheels of the vehicle as the braking force of the left wheels and the braking force of the right wheels.

According to another aspect of the present disclosure, a method for controlling a braking force of a vehicle may include obtaining information about an image in front of the vehicle and driving information of the vehicle, determining a road surface state including a left road surface state and a right road surface state based on the information about the image and the driving information, and controlling a braking force of left wheels of the vehicle and a braking force of right wheels of the vehicle respectively based on the left road surface state and the right road surface state of the vehicle.

In an embodiment, the determining of the road surface state based on the information about the image and the driving information may include determining the road surface state and a drivable area of the vehicle from the information about the image by means of a convolutional neural network (CNN).

In an embodiment, the determining of the road surface state based on the information about the image and the driving information may include dividing the image into a left image and a right image and determining the road surface state of each of the left image and the right image from the information about the image.

In an embodiment, the determining of the road surface state based on the information about the image and the driving information may include determining the road surface state from the driving information obtained during a predetermined time period by means of a deep neural network (DNN).

In an embodiment, the determining of the road surface state based on the information about the image and the driving information may include determining the left road surface state of the vehicle from the driving information obtained during the predetermined time period by an acceleration sensor, a yaw rate sensor, and left wheel speed sensors by means of the DNN and determining the right road surface state of the vehicle from the driving information obtained during the predetermined time period by the acceleration sensor, the yaw rate sensor, and right wheel speed sensors by means of the DNN.

In an embodiment, the controlling of the braking force of the left wheels of the vehicle and the braking force of the right wheels of the vehicle respectively based on the left road surface state and the right road surface state of the vehicle may include comparing a time to collision (TTC) based on the left road surface state of the vehicle and the right road surface state of the vehicle with a reference TTC to determine a risk of collision.

In an embodiment, the controlling of the braking force of the left wheels of the vehicle and the braking force of the right wheels of the vehicle respectively based on the left road surface state and the right road surface state of the vehicle may include comparing an amount of braking of the left wheels of the vehicle and an amount of braking of the right wheels of the vehicle based on the risk of collision with a required deceleration and selecting a smaller value among the amount of braking of the left wheels of the vehicle and the amount of braking of the right wheels of the vehicle as the braking force of the left wheels and the braking force of the right wheels.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various embodiments of the disclosure will be described with reference to accompanying drawings. However, it should be understood that this is not intended to limit the present disclosure to specific implementation forms and includes various modifications, equivalents, and/or alternatives of embodiments of the present disclosure.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of the expressions "A or B," "at least one of A and B," "at least one of A or B," "A, B, or C," "at least one of A, B, and C," and "at least one of A, B, or C," may include any and all combinations of one or more of the items listed together with a corresponding expression among the expressions.

Such terms as "1st" and "2nd," or "first" and "second" may be used to simply distinguish a corresponding component from another, and does not limit the components in other aspect (e.g., importance or order). It is to be understood that if any (e.g., a first) component is referred to, with or without the term "operatively" or "communicatively", as "coupled with," "coupled to," "connected with," or "connected to" another (e.g., a second) component, it means that the element may be coupled with the other element directly (e.g., wiredly), wirelessly, or via a third component.

Figure 1:
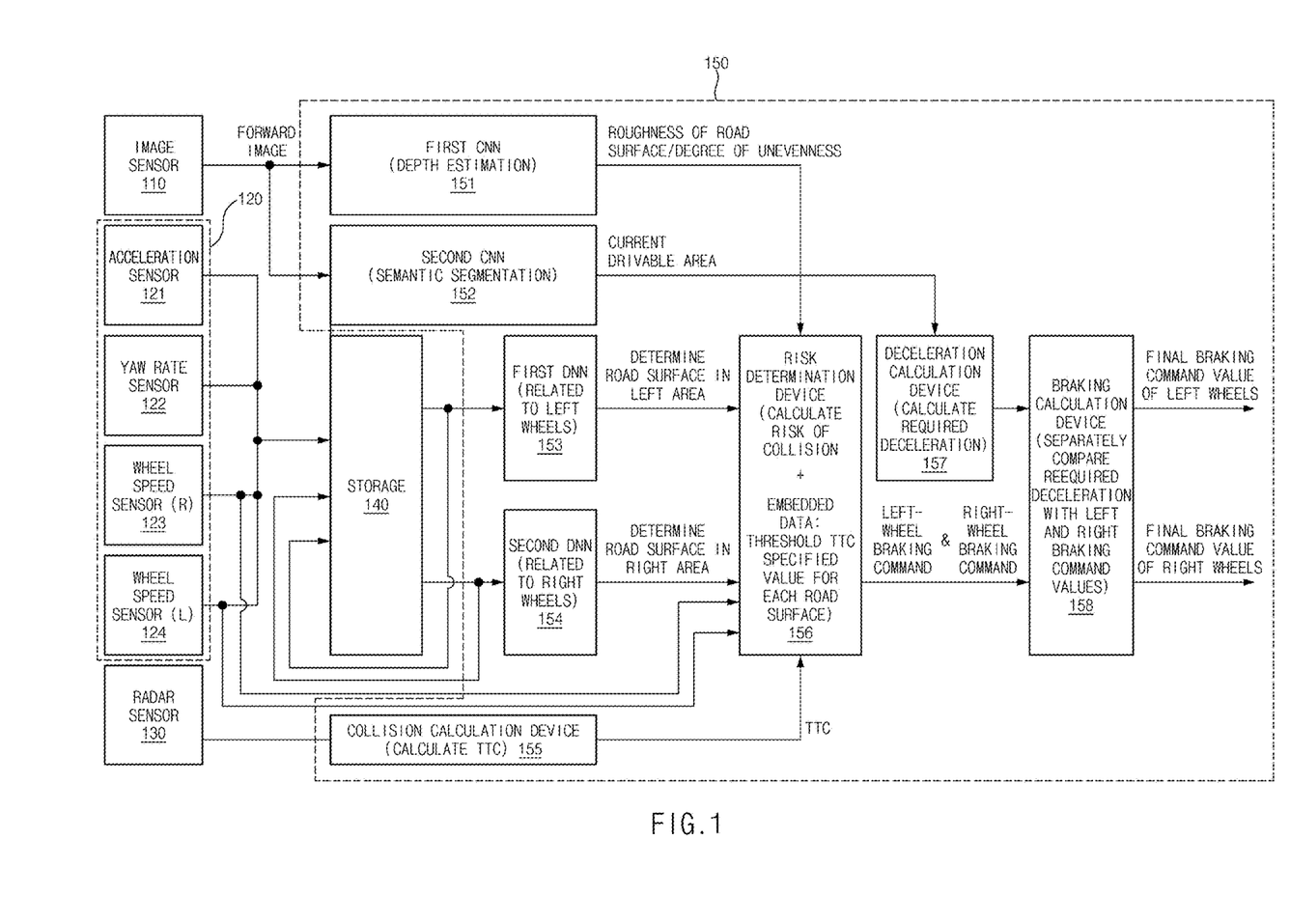
FIG. 1 is a block diagram illustrating an apparatus for controlling a braking force of a vehicle according to an embodiment of the present disclosure.
Figure 2:
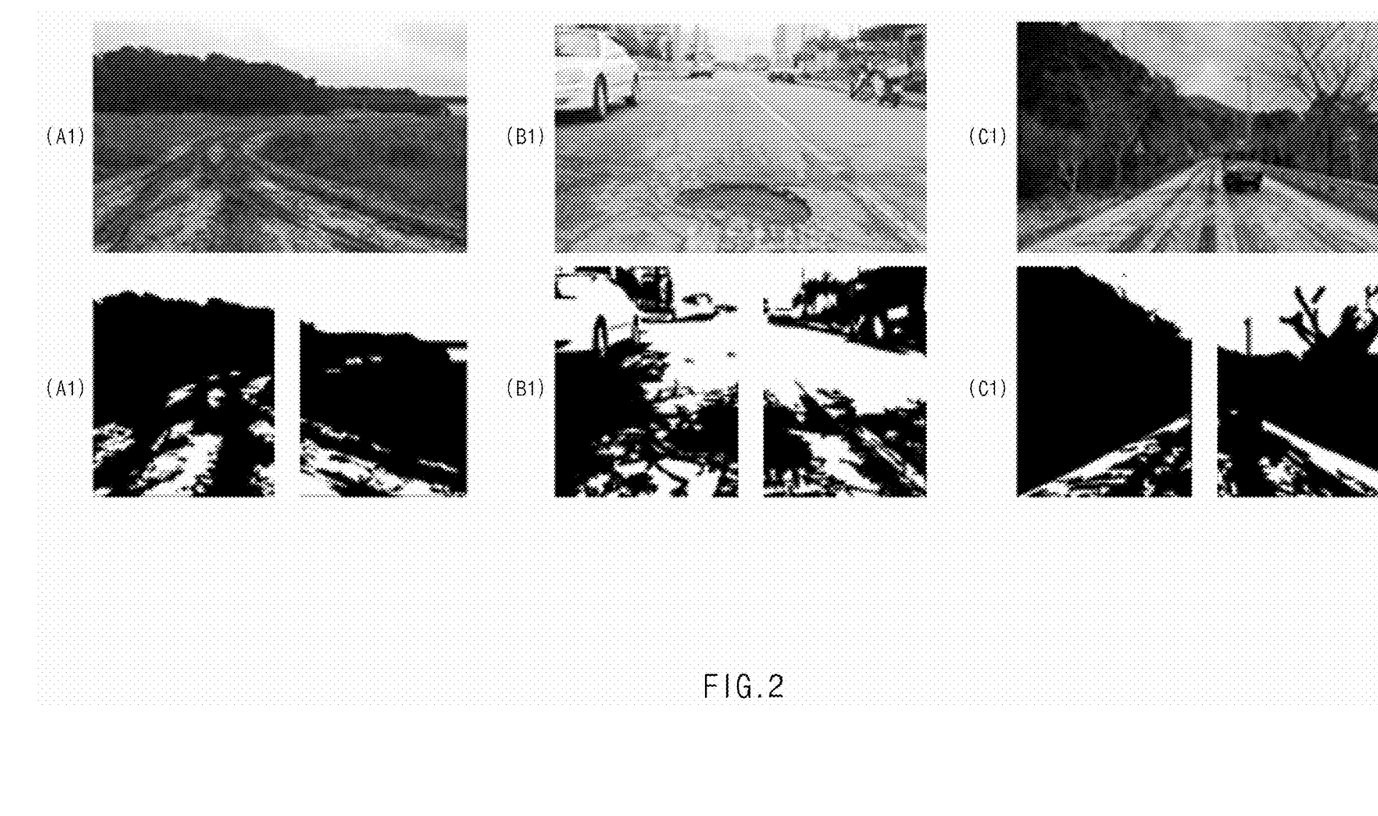
FIG. 2 is a drawing illustrating an operation by means of an image sensor according to an embodiment of the present disclosure.
Figure 3:
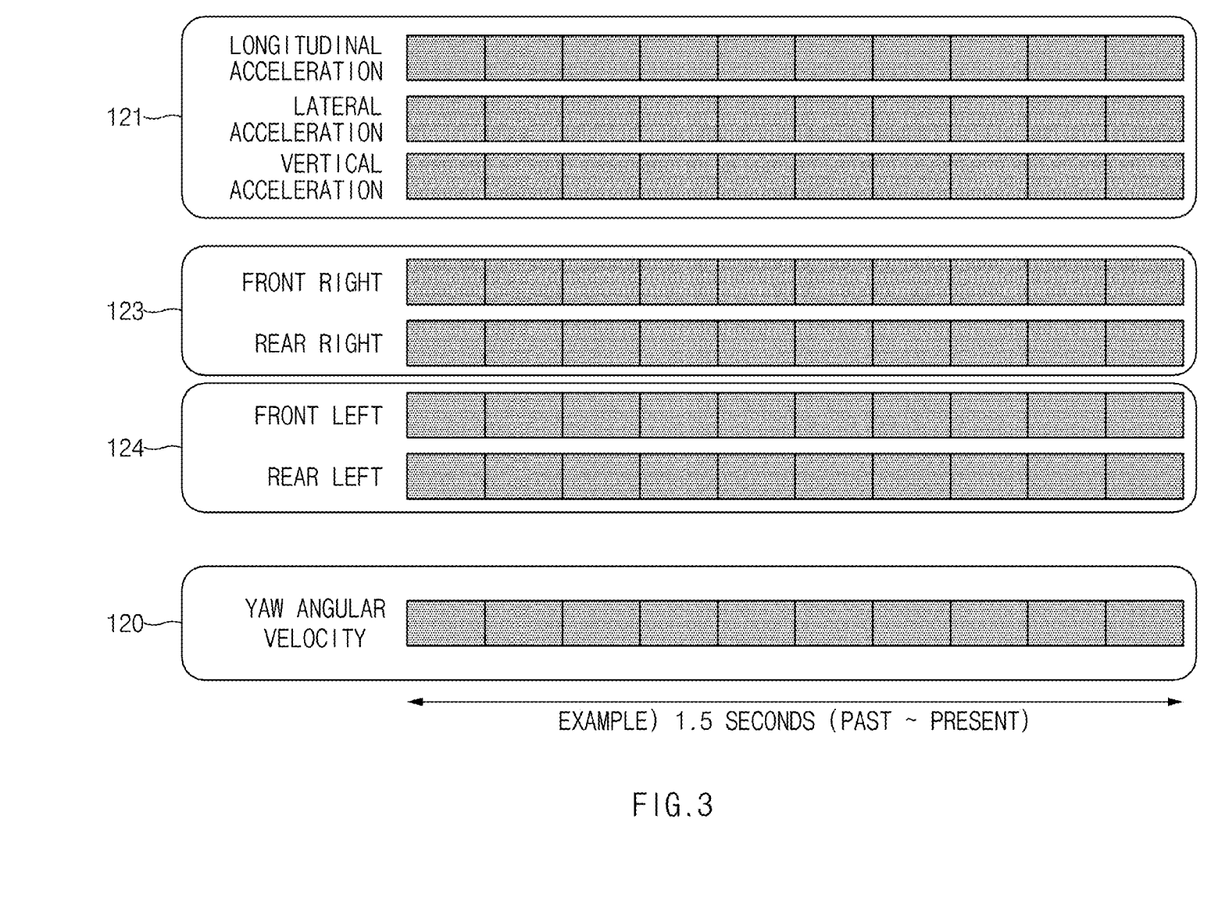
FIG. 3 is a drawing illustrating an operation by means of a vehicle sensor according to an embodiment of the present disclosure.

FIG. 1 is a block diagram illustrating an apparatus for controlling a braking force of a vehicle according to an embodiment of the present disclosure. FIG. 2 is a drawing illustrating an operation by means of an image sensor according to an embodiment of the present disclosure. FIG. 3 is a drawing illustrating an operation by means of a vehicle sensor according to an embodiment of the present disclosure.

Referring to FIG. 1, the apparatus for controlling the braking force of the vehicle according to an embodiment of the present disclosure may include an image sensor 110, a vehicle sensor 120, a radar sensor 130, storage 140, and a controller 150.

The image sensor 110 may obtain information about an image in front of a host vehicle. The image sensor 110 may include one or more cameras. Herein, the cameras may be provided in a window glass in the host vehicle, may be provided in a front panel, a room mirror in the host vehicle, or a roof panel to be exposed to the outside, and may be provided in a license plate on the front of the host vehicle, a grill on the front of the host vehicle, or an emblem on the front of the host vehicle.

The vehicle sensor 120 may obtain driving information of the host vehicle. The vehicle sensor 120 may include an acceleration sensor 121, a yaw rate sensor 122, right wheel speed sensors 123, and left wheel speed sensors 124.

The acceleration sensor 121 may measure acceleration of the host vehicle, which may sense longitudinal acceleration, lateral acceleration, and vertical acceleration. The acceleration sensor 121 may be a sensor which processes an output signal and measures a dynamic force such as acceleration, vibration, or an impact of an object, which may be implemented as an electronic acceleration sensor and a voltage acceleration sensor. For reference, the electronic acceleration sensor measures a value, corresponding to an amount where a moving body moves, as acceleration using an electromotive force of a magnet and a coil, and the voltage acceleration sensor measures a value, corresponding to applied pressure, as acceleration using a piezoelectric element which receives pressure to generate a voltage.

The yaw rate sensor 122 may be a sensor which detects a rotational angular speed in a vertical direction of the vehicle.

When an AC voltage is applied to the vibrator, the vibrator deforms and vibrates. Eventually, the vibrator always vibrates left and right at a constant frequency. The yaw rate sensor 122 may use a principle of outputting an AC voltage while it is tilted at the right angle to the direction in which the vibration is applied by the Coriolis force when the vibrator turns at a constant angular speed in this state. For example, the yaw rate sensor 122 may be installed in a steering wheel of the host vehicle to detect a yaw rate value in real time.

The right wheel speed sensors 123 may be installed at inner sides of a front right wheel and a rear right wheel of the host vehicle to detect a rotational speed of the right wheels of the host vehicle.

The left wheel speed sensors 124 may be installed at inner sides of a front left wheel and a rear left wheel of the host vehicle to detect a rotational speed of the left wheels of the host vehicle.

In other words, the right wheel speed sensors 123 and the left wheel speed sensors 124 may be respectively installed in the four left and right wheels of the host vehicle to serve to sense a rotational speed of the wheels as a change in line of magnetic force in tone wheels and sensors and input the sensed information to a computer.

The sensing data sensed by the acceleration sensor 121, the yaw rate sensor 122, the right wheel speed sensors 123, and the left wheel speed sensors 124 may be stored in the storage 140.

The radar sensor 130 may obtain data about an obstacle in front of the host vehicle. Meanwhile, obtaining the data about the obstacle may be implemented using only one of various devices, such as a light detection and ranging (LiDAR), a vision using visible light, an infrared sensor using an infrared ray, or an ultrasonic sensor using an ultrasonic wave and may be implemented in a combination thereof.

The controller 150 may determine a road surface state based on the image information and the driving information and may control a braking force of the left wheels of the host vehicle and a braking force of the right wheels of the host vehicle respectively based on the left road surface state and the right road surface state of the host vehicle. The controller 150 may include a first convolutional neural network (CNN) 151, a second CNN 152, a first deep neural network (DNN) 153, a second DNN 154, a collision calculation device 155, a risk determination device 156, a deceleration calculation device 157, and a braking calculation device 158.

Referring to FIG. 2, the first CNN 151 may determine a road surface state, such as roughness of the road surface or a degree of unevenness, by extracting an area characteristic based on depth estimation from the image information (e.g., A1, B1, and C1 in FIG. 2). The first CNN 151 may extract depth information from the image information using a depth estimation network such as a mono depth net.

The first CNN 151 may divide the image, the depth information of which is extracted, into a left image and a right image (e.g., A2, B2, and C2 in FIG. 2) and may determine a road surface state of each of the left image and the right image. The first CNN 151 may output a characteristic of a road surface, for example, roughness of the road surface where the left wheels of the host vehicle will pass or the presence of unevenness such as a puddle as the road surface is dug, in real time from the left image and may output a characteristic of a road surface, for example, roughness of the road surface where the right wheels of the vehicle will pass or the presence of unevenness such as a puddle as the road surface is dug, in real time from the right image.

The second CNN 152 may determine which part of the left image, the depth image of which is extracted by the first CNN 151, is to be determined as the road surface on which the left wheels are able to travel and may determine which part of the right image is to be determined as the road surface on which the right wheels are able to travel. The second CNN 152 may determine a drivable area of the host vehicle using a semantic segmentation technique.

The first DNN 153 may determine a road surface state in a left area of the host vehicle from the driving information obtained by means of the vehicle sensor 120. The first DNN 153 may receive pieces of data of about 1.5 seconds to about 2 seconds in the past (e.g., corresponding to a predetermined time period), which are learned and stored, among data of the acceleration sensor 121, data of the yaw rate sensor 122, and data of the left wheel speed sensors 124, which are stored in the storage 140, and may determine the road surface state in the left area of the host vehicle.

The second DNN 154 may determine a road surface state in a right area of the host vehicle from the driving information obtained by means of the vehicle sensor 120. The second DNN 154 may receive pieces of data of about 1.5 seconds to about 2 seconds in the past (e.g., corresponding to a predetermined time period), which are learned and stored, among the data of the acceleration sensor 121, the data of the yaw rate sensor 122, and the data of the left wheel speed sensor 123, which are stored in the storage 140, and may determine the road surface state in the right area of the host vehicle.

For example, when the left wheels of the host vehicle travel on a muddy road surface and when the right wheels of the host vehicle travels on a dry road surface, because pieces of data measured by the acceleration sensor, the yaw rate sensor, and the wheel speed sensors when the host vehicle passes through the muddy road surface and when the host vehicle passes through the dry road surface are able to be different from each other, the controller 150 may determine the road surface state in the left area or the right area of the host vehicle due to such a difference or the like.

The collision calculation device 155 may calculate a time to collision (TTC) between the host vehicle and the obstacle based on the distance between the host vehicle and the obstacle, which is detected by means of the radar sensor 130. In other words, the collision calculation device 155 may obtain location information and speed information of the obstacle detected by means of the radar sensor 130 from the information about the obstacle and may obtain a relative distance between the host vehicle and the obstacle and a relative speed between the host vehicle and the obstacle based on the obtained location information and the obtained speed information of the obstacle, thus obtaining the TTC between the host vehicle and the obstacle based on the obtained relative distance and the obtained relative speed.

The risk determination device 156 may differently output amounts of braking of the left wheels and the right wheels according to the road surface state and the risk of collision, based on the speed of the right wheels of the host vehicle by means of the right wheel speed sensors 123, the speed of the left wheels of the host vehicle by means of the left wheel speed sensors 124, the TTC calculated by the collision calculation device 155, the road surface state output from the first CNN 151, the road surface state in the left area of the host vehicle, which is output from the first DNN 153, and the road surface state in the right area of the host vehicle, which is output from the second DNN 154.

For example, there may be a TTC calculated based on the relative distance between the host vehicle and the obstacle, and there may be differently a TTC calculated based on a road surface state such as a wet state, a rough state, a dry state, or an ice state of the road surface. Thus, when the TTC calculated based on the relative distance between the host vehicle and the obstacle is 0.8 seconds and when the TTC based on the road surface state is 0.7 seconds, the risk determination device 156 may determine that there is a risk of collision according to the road surface state. In addition, when the TTC is 0.7 seconds when the road surface state is a dry state, because the braking distance is long when the road surface state is a wet state, the risk determination device 156 may set the TTC to a high value such as 1.2 seconds. At this time, when road surface states of the left wheels and the right wheels are different from each other, for example, when the left wheels are on a dry road surface and when the right wheels are on a wet road surface, the risk determination device 156 may differently set amounts of braking of the left wheels and the right wheels according to the different road surface states.

The deceleration calculation device 157 may calculate required deceleration to decelerate and avoid a collision between the host vehicle and the obstacle, which may calculate the required deceleration where the required deceleration [m/s2]=−(relative speed)2/(2×relative distance).

At this time, although there is no obstacle in front of the host vehicle, there may be no drivable area. For example, because the host vehicle should not travel more than a certain distance when the road surface is less in width than the host vehicle in the certain distance in front of the host vehicle, the deceleration calculation device 157 may calculate a relative distance as the certain distance where the host vehicle is able to travel to calculate the required deceleration.

The braking calculation device 158 may compare the required deceleration calculated by the deceleration calculation device 157 with the amount of braking of the left wheels and the amount of braking of the right wheels, which are output from the risk determination device 156, and may select a smaller value as a final braking force. In other words, the braking calculation device 158 may compare the required deceleration with the amount of braking of the left wheels to select a smaller value as a final braking force of the left wheels and may compare the required deceleration with the amount of braking of the right wheels to select a smaller value as a final braking force of the right wheels At this time, because the required deceleration, the amount of braking of the left wheels, and the amount of braking of the right wheels are output as negative values, as there are a smaller value, the braking force may be increased.

Thus, when the road surface state of the left wheels and the road surface state of the right wheels are different from each other, a braking force of the left wheels and a braking force may be differently output. For example, when the entire road surface is not an icy road and when only the road surface of the left wheels is icy and the road surface of the right wheels is not icy, because the left wheels have a small friction force due to the ice when the left wheels and the right wheels are controlled using the same braking force, the host vehicle may rotate to cause an accident. Thus, when changing braking forces for the left wheels on an icy road surface and the right wheels on a road surface which is not icy, the braking calculation device 158 may prevent the host vehicle from rotating when braking the host vehicle to prevent an accident.

In addition, the controller 150 may control at least one other component (e.g., a hardware or software component) of the apparatus for controlling the braking force of the vehicle and may perform a variety of data processing or calculation. According to an embodiment, as at least a portion of data processing or calculation, the controller 150 may store commands or data received from another component (e.g., the sensor) in a volatile memory, may process the commands or data stored in the volatile memory, and may store result data in a non-volatile memory. According to an embodiment, the controller 150 may include a main processor (e.g., a central processing unit or an application processor) or an auxiliary processor (e.g., a graphics processing unit, an image signal processor, a sensor hub processor, a communication processor) operable independently or together with it. For example, the auxiliary processor may be configured to, when the controller 150 includes the main processor and the auxiliary processor, use lower power than the main processor or specialize in a specified function. The auxiliary processor may be implemented independently of the main processor or as a part thereof.

In addition, the storage 140 may store instructions to control the apparatus for controlling the braking force of the vehicle, a control instruction code, control data, or user data. For example, the storage 140 may include at least one of an application program, an operating system (OS), middleware, or a device driver. The storage 140 may include one of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like. The storage 140 may further include a non-volatile medium such as a hard disk drive (HDD), a solid state disk (SSD), an embedded multimedia card (eMMC), or a universal flash storage (UFS).

Hereinafter, a description will be given in detail of a method for controlling a braking force of a vehicle according to another embodiment of the present disclosure with reference to FIG. 4.

Figure 4:
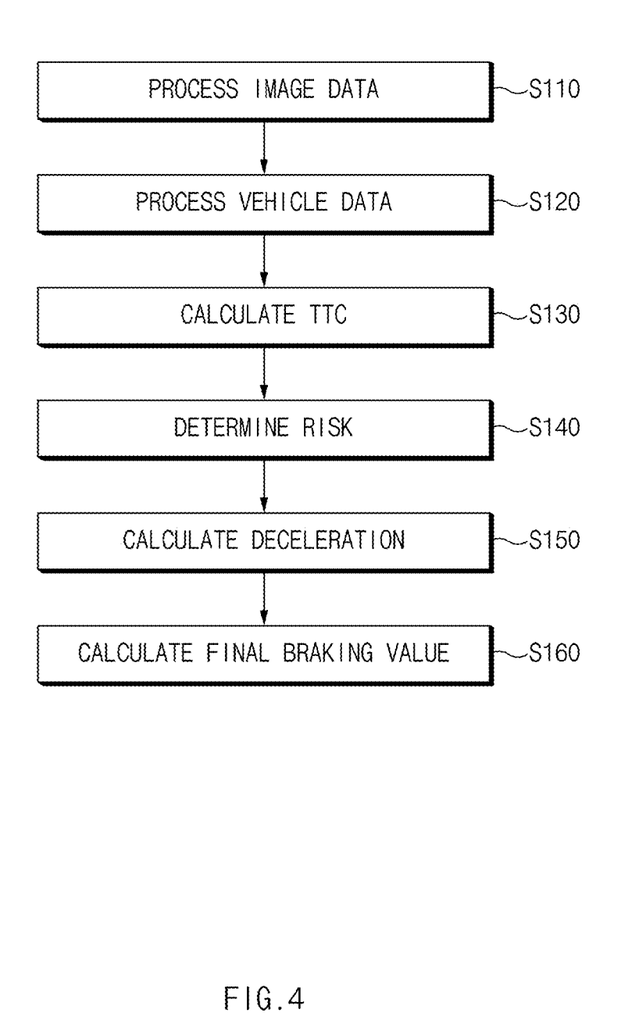
FIG. 4 is a flowchart illustrating a method for controlling a braking control of a vehicle according to an embodiment of the present disclosure.

FIG. 4 is a flowchart illustrating a method for controlling a braking control of a vehicle according to an embodiment of the present disclosure.

Hereinafter, it is assumed that an apparatus for controlling a braking force of a vehicle in FIG. 1 performs a process of FIG. 4.

First of all, a first CNN 151 may determine a road surface state, such as roughness of a road surface or a degree of unevenness, by extracting an area characteristic based on depth estimation from image information (e.g., A1, B1, and C1 in FIG. 2) and may extract depth information from the image information using a depth estimation network such as a mono depth net.

Next, the first CNN 151 may divide the image, the depth information of which is extracted, into a left image and a right image (e.g., A2, B2, and C2 in FIG. 2) to determine a road surface state of each of the left image and the right image, may output a characteristic of a road surface, for example, roughness of the road surface where the left wheels of the vehicle will pass or the presence of unevenness such as a puddle as the road surface is dug, in real time from the left image and may output a characteristic of a road surface, for example, roughness of the road surface where the right wheels of the vehicle will pass or the presence of unevenness such as a puddle as the road surface is dug, in real time from the right image. In S110, the second CNN 152 may determine which part of the left image, the depth image of which is extracted by the first CNN 151, is to be determined as the road surface on which the left wheels are able to travel and may determine which part of the right image is to be determined as the road surface on which the right wheels are able to travel, thus determining a drivable area of the host vehicle using a semantic segmentation technique.

Next, the first DNN 153 may determine a road surface state in a left area of the host vehicle from the driving information obtained by means of a vehicle sensor 120 and may receive pieces of data of about 1.5 seconds to about 2 seconds in the past, which are learned and stored, among data of an acceleration sensor 121, data of a yaw rate sensor 122, and data of left wheel speed sensors 124, which are stored in the storage 140, to determine the road surface state in the left area of the host vehicle. The second DNN 154 may determine a road surface state in a right area of the host vehicle from the driving information obtained by means of the vehicle sensor 120 and may receive pieces of data of about 1.5 seconds to about 2 seconds in the past, which are learned and stored, among the data of the acceleration sensor 121, the data of the yaw rate sensor 122, and the data of right wheel speed sensors 123, which are stored in the storage 140, to determine the road surface state in the right area of the host vehicle.

In S130, a collision calculation device 155 may a time to collision (TTC) between the host vehicle and an obstacle based on a distance between the host vehicle and the obstacle, which is detected by means of a radar sensor 130.

In S140, a risk determination device 156 may differently output amounts of braking of the left wheels and the right wheels according to the road surface state and the risk of collision, based on the speed of the right wheels of the host vehicle by means of right wheel speed sensors 123, the speed of the left wheels of the host vehicle by means of left wheel speed sensors 124, the TTC calculated by the collision calculation device 155, the road surface state output from the first CNN 151, the road surface state in the left area of the host vehicle, which is output from the first DNN 153, and the road surface state in the right area of the host vehicle, which is output from the second DNN 154.

In S150, a deceleration calculation device 157 may calculate required deceleration to decelerate and avoid a collision between the host vehicle and the obstacle.

In S160, a braking calculation device 158 may compare the required deceleration calculated by the deceleration calculation device 157 with the amount of braking of the left wheels and the amount of braking of the right wheels, which are output from the risk determination device 156, and may select a smaller value as a final braking force.

As described above, according to an embodiment of the present disclosure, the apparatus for controlling the braking of the vehicle may be an automatic braking system in various road surface situations for the advancement of fully autonomous driving and the driver assistance system, which may apply active safety and a collision avoidance system in the various road surface situations based on images and deep learning and may ensure behavior stability by means of differential emergency braking to prevent an accident in a bad weather situation where there is an increase in occurrence of an accident, when the road surface state partially differs, thus preventing loss of human and material property.

Various embodiments of the present disclosure may be implemented as software (e.g., a program or an application) including instructions that are stored in a machine-readable storage medium (e.g., a memory). For example, the machine may invoke at least one of one or more instructions stored in the storage medium and may execute the invoked instruction. This allows the machine to be operated to perform at least one function according to the at least one instruction invoked. The one or more instructions may include a code generated by a complier or a code executable by an interpreter.

The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

According to an embodiment, a method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be divided and arranged in another component.

According to various embodiments, one or more of the above-mentioned components or operations may be omitted, or one or more other components or operations may be added.

Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

The present technology may be an automatic braking system in various road surface situations for the advancement of fully autonomous driving and the driver assistance system, which may apply active safety and a collision avoidance system in the various road surface situations based on images and deep learning and may ensure behavior stability by means of differential emergency braking to prevent an accident in a bad weather situation where there is an increase in occurrence of an accident, when the road surface state partially differs, thus preventing loss of human and material property.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for controlling a braking force of a vehicle, the apparatus comprising:
   a sensor device configured to obtain information about an image in front of the vehicle and driving information of the vehicle; and
   a controller configured to determine a road surface state including a left road surface state and a right road surface state based on the information about the image and the driving information and control a braking force of left wheels of the vehicle and a braking force of right wheels of the vehicle respectively based on the left road surface state and the right road surface state of the vehicle,
   wherein the controller compares a time to collision (TTC) based on the left road surface state of the vehicle and the right road surface state of the vehicle with a reference TTC to determine a risk of collision, and
   the controller compares an amount of braking of the left wheels of the vehicle and an amount of braking of the right wheels of the vehicle based on the risk of collision with a required deceleration and selects a smaller value among the amount of braking of the left wheels of the vehicle and the amount of braking of the right wheels of the vehicle as the braking force of the left wheels and the braking force of the right wheels.

2. The apparatus of claim 1, wherein the controller determines the road surface state and a drivable area of the vehicle from the information about the image by means of a convolutional neural network (CNN).

3. The apparatus of claim 2, wherein the controller divides the image into a left image and a right image and determines the road surface state of each of the left image and the right image from the information about the image.

4. The apparatus of claim 1, wherein the controller determines the road surface state from the driving information obtained during a predetermined time period by means of a deep neural network (DNN).

5. The apparatus of claim 4, wherein the controller determines the left road surface state of the vehicle from the driving information obtained during the predetermined time period by an acceleration sensor, a yaw rate sensor, and left wheel speed sensors by means of the DNN and determines the right road surface state of the vehicle from the driving information obtained during the predetermined time period by the acceleration sensor, the yaw rate sensor, and right wheel speed sensors by means of the DNN.

6. A method for controlling a braking force of a vehicle, the method comprising:
   obtaining information about an image in front of the vehicle and driving information of the vehicle;
   determining a road surface state including a left road surface state and a right road surface state based on the information about the image and the driving information; and
   controlling a braking force of left wheels of the vehicle and a braking force of right wheels of the vehicle respectively based on the left road surface state and the right road surface state of the vehicle,
   wherein the controlling of the braking force of the left wheels of the vehicle and the braking force of the right wheels of the vehicle respectively based on the left road surface state and the right road surface state of the vehicle includes: comparing a time to collision (TTC) based on the left road surface state of the vehicle and the right road surface state of the vehicle with a reference TTC to determine a risk of collision, and
   the controlling of the braking force of the left wheels of the vehicle and the braking force of the right wheels of the vehicle respectively based on the left road surface state and the right road surface state of the vehicle includes: comparing an amount of braking of the left wheels of the vehicle and an amount of braking of the wheels of the vehicle based on the risk of collision with a required deceleration and selecting a smaller value among the amount of braking of the left wheels of the vehicle and the amount of braking of the right wheels of the vehicle as the braking force of the left wheels and the braking force of the right wheels.

7. The method of claim 6, wherein the determining of the road surface state based on the information about the image and the driving information includes:
   determining the road surface state and a drivable area of the vehicle from the information about the image by means of a convolutional neural network (CNN).

8. The method of claim 7, wherein the determining of the road surface state based on the information about the image and the driving information includes:
   dividing the image into a left image and a right image and determining the road surface state of each of the left image and the right image from the information about the image.

9. The method of claim 6, wherein the determining of the road surface state based on the information about the image and the driving information includes:
   determining the road surface state from the driving information obtained during a predetermined time period by means of a deep neural network (DNN).

10. The method of claim 9, wherein the determining of the road surface state based on the information about the image and the driving information includes:
    determining the left road surface state of the vehicle from the driving information obtained during the predetermined time period by an acceleration sensor, a yaw rate sensor, and left wheel speed sensors by means of the DNN and determining the right road surface state of the vehicle from the driving information obtained during the predetermined time period by the acceleration sensor, the yaw rate sensor, and right wheel speed sensors by means of the DNN.

* * * * *